United States Patent
Tan et al.

(10) Patent No.: US 9,292,718 B2
(45) Date of Patent: Mar. 22, 2016

(54) APPARATUS FOR FORMING AND READING AN IDENTIFICATION FEATURE AND METHOD THEREOF

(75) Inventors: Winston Cheng Lock Tan, Singapore (SG); Peter Malcolm Moran, Singapore (SG); Jeck Siu Mei Ng, Singapore (SG); Adrian Paul Burden, Malvern Worcestershire (GB); Stefano Bittante, Maser (IT)

(73) Assignee: BILCARE TECHNOLOGIES SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 13/995,128

(22) PCT Filed: Dec. 16, 2011

(86) PCT No.: PCT/SG2011/000439
§ 371 (c)(1),
(2), (4) Date: Aug. 29, 2013

(87) PCT Pub. No.: WO2012/082076
PCT Pub. Date: Jun. 21, 2012

(65) Prior Publication Data
US 2014/0001261 A1    Jan. 2, 2014

Related U.S. Application Data

(60) Provisional application No. 61/423,635, filed on Dec. 16, 2010.

(51) Int. Cl.
*G06K 19/00* (2006.01)
*G06K 5/00* (2006.01)
(Continued)

(52) U.S. Cl.
CPC *G06K 5/00* (2013.01); *G06K 7/087* (2013.01); *G06K 19/12* (2013.01)

(58) Field of Classification Search
USPC .......................................... 235/435, 437, 439
See application file for complete search history.

(56) References Cited

U.S. PATENT DOCUMENTS

2004/0112962 A1* 6/2004 Farrall et al. ............. 235/462.01
2007/0252001 A1  11/2007 Kail et al.
(Continued)

FOREIGN PATENT DOCUMENTS

| CN | 101344931 | 1/2009 |
| CN | 101479750 | 7/2009 |
| WO | 2009105040 | 8/2009 |

OTHER PUBLICATIONS

International Search Report of PCT/SG2011/000439, mailed May 28, 2012, 4 pages.
(Continued)

*Primary Examiner* — Matthew Mikels
(74) *Attorney, Agent, or Firm* — Pillsbury Winthrop Shaw Pittman LLP

(57) ABSTRACT

Embodiments of the invention provide a method of reading and verifying a tag based on inherent disorder during a manufacturing process. The method includes using a first reader to take a first reading of an inherent disorder feature of the tag, and using a second reader to take a second reading of the inherent disorder feature of the tag. The method further includes matching the first reading with the second reading, and determining one or more acceptance criteria, wherein at least one of the acceptance criteria is based on whether the first reading and the second reading match within a predetermined threshold. If the acceptance criteria are met, then the tag is accepted, and a fingerprint for the tag is recorded. The invention further provides a method of testing and characterizing a reader of inherent disorder tags during a manufacturing process. The method includes taking a reading of a known inherent disorder tag, using the reading to measure a characteristic of the reader, and storing the measured characteristic for use when reading inherent disorder tags.

25 Claims, 6 Drawing Sheets

(51) Int. Cl.
*G06K 7/08* (2006.01)
*G06K 19/12* (2006.01)

(56) References Cited

U.S. PATENT DOCUMENTS

2009/0102606 A1 4/2009 Kim et al.
2009/0218401 A1 9/2009 Moran et al.
2010/0052908 A1 3/2010 Doan et al.

OTHER PUBLICATIONS

Chinese Office Action dated Aug. 11, 2015 for corresponding Chinese Patent Application No. 201180067848.0 (21 pages).

* cited by examiner

APPARATUS FOR FORMING AND READING AN IDENTIFICATION FEATURE AND METHOD THEREOF

CROSS REFERENCE TO RELATED APPLICATIONS

This application is a national stage of International Patent Application No. PCT/SG2011/000439 filed on Dec. 16, 2011, which claims priority to U.S. provisional application No. 61/423,635 filed Dec. 16, 2010, the contents of which are incorporated herein in their entireties.

FIELD OF THE INVENTION

Embodiments of the invention relate to the field of tags that include authentication and identification features based on inherent disorder, and readers for such tags. In particular, the invention relates to reading such tags and evaluating tag readers in a mass-production environment.

BACKGROUND OF THE INVENTION

Identification features such as bar codes, optical characters, Radio Frequency Identification (RFID), magnetic or optical strips, and other means of identifying or authenticating objects have been used for purposes of identification, authentication, and tracking and tracing. Recently, "inherent disorder"-based features of objects have also been used either alone or in combination with other identification features to uniquely identify objects and to provide evidence of the authenticity of objects for anti-counterfeiting purposes. An "inherent disorder"-based feature is a feature based on a disordered material, wherein the structure of the disorder is used to identify the object. The disordered material may be a part of the object itself, or may be part of a tag that is affixed to the object. Further, the disordered material may include a disordered coating, composite, or structure.

There are numerous previously known examples of the use of inherent disorder for identification and authentication purposes. For example, Ingenia Technology Limited, of London, UK, has described a system that uses the inherent disorder of fibers within paper, mapped using laser-speckle interferometry, to uniquely identify the paper. A more complete description of this technology can be found in PCT application WO 2006/016114.

Another previously known use of inherent disorder is shown in U.S. Pat. No. 7,380,128, assigned to Novatec, SA, of Montauben, France. This patent shows use of random bubbles within a transparent polymer for identification and authentication. Optical methods are used to read the three-dimensional layout of the bubbles within the polymer. This information can be used to provide a unique signature for a "bubble tag", which is difficult or impossible to replicate.

Other inherent disorder-based identification and authentication technologies include use of randomly distributed quantum dots or nanobarcodes, use of ink containing magnetic particles arranged in a disordered pattern, use of random "jitter" in the magnetic stripes of credit cards, and use of random distribution of taggant particles that are invisible to human vision on an article (see PCT application WO 2005/104008).

Additional inherent disorder-based tags that use a combination of magnetic and/or magnetisable and/or conductive and/or semi-conductive and/or optically active particles and/or optically distinguishable particles have been reported by the present applicant, Bilcare Technologies and by the Agency for Science Technology and Research (A*Star). These technologies are further detailed in PCT applications WO 2005/008294, WO 2006/078220, WO 2007/133164, WO 2007/133163, and WO 2009/105040.

Various signal detection systems based on optical, magnetic, and magneto-optical effects are used to read these inherent disorder features. Once read, information on the inherent disorder features can be processed either in the reading device itself or in a back-end computer system to use the information for identification and/or authentication purposes.

In order to use tags based on inherent disorder for identification and/or authentication purposes, a "fingerprint" for each such tag may be read and stored in a database, typically at the time that the tag is manufactured (though later reading and storing, such as at the time that a tag is applied to an object is also possible). This database can later be referenced when a tag is read, to verify the tag. In a mass production environment, it would be desirable to read the tags that are being manufactured rapidly and in a consistent manner. Similarly, when mass producing readers for such tags, it would be desirable to provide readers having consistent performance in reading tags.

SUMMARY OF THE INVENTION

In accordance with embodiments of the invention, a method of reading and verifying a tag based on inherent disorder during a manufacturing process is provided. The method includes using a first reader to take a first reading of an inherent disorder feature of the tag, and using a second reader to take a second reading of the inherent disorder feature of the tag. The first reading is matched with the second reading, and one or more acceptance criteria are determined, wherein at least one of the acceptance criteria is based on whether the first reading and the second reading match within a predetermined threshold. If the acceptance criteria are met, then the tag is accepted and a fingerprint for the tag is recorded.

In some embodiments, determining the one or more acceptance criteria further includes determining an acceptance criterion based on an individual reading or each individual reading, such as the strength or complexity of a signal in at least one of the first reading and the second reading.

In some embodiments, the method further includes rejecting a tag that is not accepted. Rejecting a tag may include removing the tag without stopping the flow of production. Removing the tag may be accomplished, for example, by marking the tag as rejected, cutting out the tag, punching out the tag, or removing tags "on the fly", for example using a suction method to remove the tag. Rejected tags may also be noted in a database.

In some embodiments, if one or more of the acceptance criteria are not met, then a third (or further) reader may be used to take a third (or further) reading of the inherent disorder feature of the tag. This third reading is matched with the first reading and the second reading, and one or more further acceptance criteria are determined. At least one of the further acceptance criteria is based on whether the first reading and the third reading match within the predetermined threshold or whether the second reading and the third reading match within the predetermined threshold. The tag is accepted if the further acceptance criteria are met, and a fingerprint for the tag based on the first reading may be recorded if the first reading and the third reading match within the predetermined threshold. A fingerprint for the tag based on the second reading may be recorded if the second reading and the third reading match within the predetermined threshold. Alternatively, more than one reading may be stored.

In some embodiments, the method further includes using a third (or further) reader to take a third (or further) reading of the inherent disorder feature of the tag, and matching some or all of the readings with each other. An acceptance criterion is determined based on whether the readings being matched against each other match within the predetermined threshold. In some embodiments, more than three readers may be used. Regardless of the numbers of readers used, readings from some or all of the readings may be matched against each other.

The performance of the first reader, the second reader, and the third reader may also be checked. This can be done by determining if one of the first reader, the second reader, or the third reader provides readings that are significantly different from the other two readers.

In some embodiments, the conditions for each of the first, second, and third readers may be varied, so that readings from each of the first, the second, and the third readers cover a range of conditions within predetermined thresholds. Varying the conditions may include using different aged readers for the first, second, and third readers and/or varying the temperature conditions for each of the first, second, and third readers, or using readers with a known variation in performance, such that the variation in performance covers or otherwise accounts for the expected range of performance in readers that will be used in the field.

Varying the conditions of the readers may also include offsetting each of the first, second, and third readers from each other. In some embodiments, the readers may be offset from each other by a constant distance. This constant distance may be determined using false acceptance rate and false rejection rate tolerances. Further, the constant distance may be used to determine a minimum number of readers to use in the manufacturing process for tags.

In another embodiment of the invention, a method of testing and characterizing a reader of inherent disorder tags during a manufacturing process is provided. The method includes taking a reading of a known inherent disorder tag, and using the reading to measure a characteristic of the reader. The measured characteristic may be stored, for example in a database or on the reader, for use when reading inherent disorder tags.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Mass production of tags based on inherent disorder and readers for such tags present numerous challenges. Because such tags are based on inherent disorder, rather than on a predictable pattern, there is no objective way to know, from a single reading, whether such a tag has been read correctly during a manufacturing process. Such difficulties might not arise in other tags, where it is known a priori what the signal should be, however it is a fundamental problem for inherently disordered systems. For example, imagine that a production line reader reads a tag, and the tag passes basic threshold criteria, e.g. it has 4 peaks above a threshold and the maximum intensity of the signal is above a second threshold (such threshold criteria will be discussed in greater detail below). Based on this reading, the tag seems to be good, but because the tag is based on inherent disorder, such a reading and the meeting of threshold criteria are inadequate to prove that the reading of the tag is good and repeatable, and that the tag should be accepted. What if there was a large piece of dirt on the reader, and the tag in fact has 10 peaks above the threshold instead of 4? If we have no way of knowing this, then the tag will be accepted and sent out, but in the field it may not match the initial reading, since the reading in the field would likely be very different from the initial reading. Similarly, it would be difficult to know if a read head is starting to wear out and the tags which are being rejected are actually being correctly rejected, or there are more rejections because of a problem with the read head.

Other issues may arise, for example, due to misalignments between different readers, which could cause the readings of the tags may be totally different from reader to reader. Because the tag's fingerprint is essentially disordered, there is no way to predict based on a reading with a first alignment what the reading with the second alignment might be.

Similarly, when mass producing readers it can be important to make measurements of each individual reader, and store an offset value for each reader in the server which does the fingerprint matching so that the offsets can be accounted for, improving the speed and accuracy of the matching.

Figure 1:
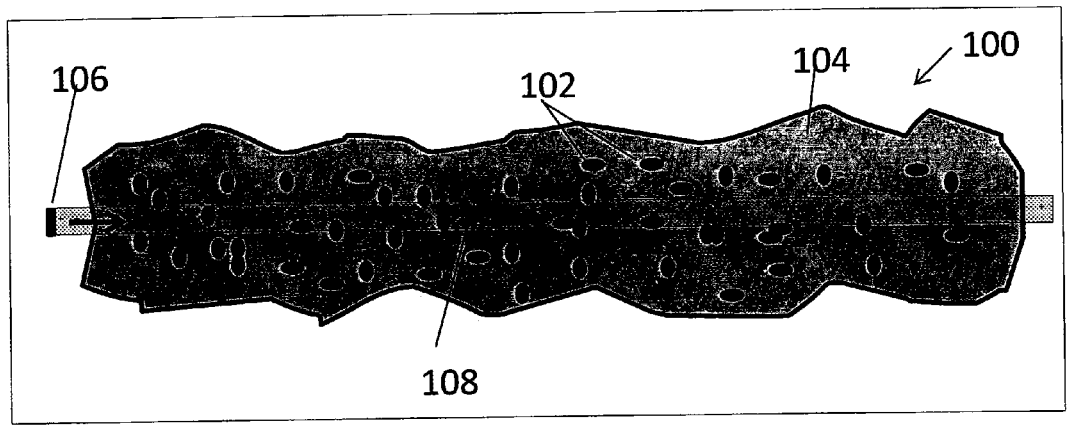
FIG. 1 shows an inherent disorder tag over which a single read head is passed during a manufacturing process.

FIG. 1 shows a tag 100, on which numerous magnetic particles 102 are distributed in a disordered manner within a non-magnetic or weakly magnetic medium to form a fingerprint material 104 in a disordered manner. A read head 106 is passed over the tag 100 along a path 108, which shows the motion of the read head over the fingerprint during a swipe. The path 108 could also represent the path of a read head used to read and verify the tag during a manufacturing process. Particles 102 could also be optically different from the fingerprint material 104 and the read head 106 could be sensitive to optical variation. Particles 102 could also be features (such as voids, rather than particles). Particles 102 may also be substantially different in shape from that shown in this figure; for example with elongated aspect ratio such as fibers, or complex shapes (such as shards, fractals or 'snowflakes'). Although the term "particles" is used herein, and the examples often refer to particles or magnetic particles, the principles of the invention as described are intended to be applied generally to disorder features of any kind. Depending on the material of the particles (or other features) 102, the read head 106 can be varied to sense different physical properties, such as conductivity, hardness, reflectivity, polarization, magnetic field strength, and fluorescence. It should also be noted that although many example embodiments are described in terms of a read head being swiped over a disordered material, the same principles could be applied to other types of sensors, such as linear sensors, in which numerous sensors are arranged in a line, or area sensors, such as CCD arrays.

Additionally, although the particles in FIG. 1 are shown as being small in comparison to the width of the reading track, this is only for illustrative purposes. In some embodiments, the particles may be larger than the width of the reading track, may overlap, or may otherwise be configured differently than they are shown in FIG. 1.

It should further be noted that as used herein, the terms "fingerprint material" and "disordered material" are used to denote a material having an inherently disordered structure that is used for authenticating the material or the tag/object that the material is attached to or embedded into. These terms include composite materials (such as the example described above with reference to FIG. 1). The term "fingerprint" is used throughout purely for ease and clarity, due to the fact that using a disordered material as an identifier is in some ways analogous to using a human fingerprint (which is inherently disordered) to identify a human. Note further that although the term "tag" is used herein, it is contemplated that this invention is also applicable to other situations, e.g. where the fingerprint material is attached or embedded directly to an object of value to be authenticated or to an ID card for example. Therefore, the term "tag" is used herein to mean any object or item of value to which the fingerprint material is or may be attached or into which such a fingerprint or fingerprint material may be embedded.

Figure 2:
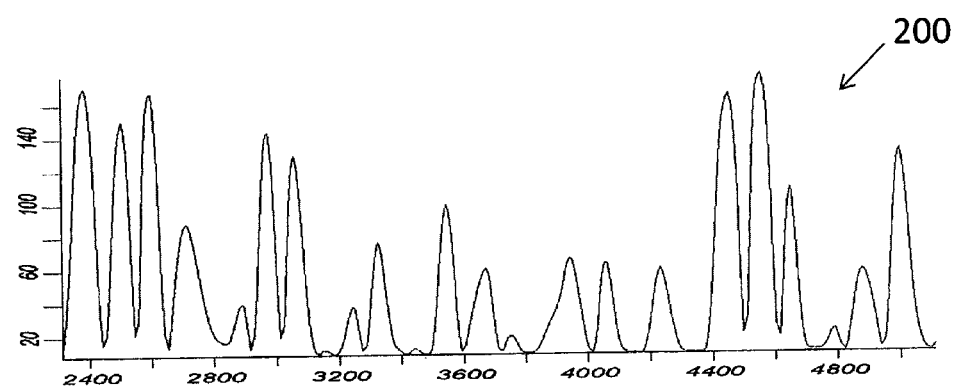
FIG. 2 shows a signal that may be obtained by passing a read head over the inherent disorder tag of FIG. 1.

FIG. 2 shows the signal that may be obtained by passing the read head 106 of FIG. 1 over the tag 100 of FIG. 1. The signal 200 shown in FIG. 2 may seem to be acceptable, and might pass any basic criteria set in terms of total number of peaks etc., but it is impossible to know from just this reading if the reading is indeed accurate and representative of the tag.

Therefore, in accordance with an embodiment of the invention, at least one further reading is taken on the production line or at some other stage of the manufacturing, quality control, shipping, or sales process prior to provision, use, and/or verification of the tag by the end user, and that reading is compared with the first reading in order to ascertain that the first reading was indeed an accurate representation of the signal from the tag. If these two readings match above a certain threshold, the tag may be accepted, and a "fingerprint" for the tag recorded in a database. It should be noted that this fingerprint may be any one of the readings, a composite of the readings, or a fingerprint that is derived or computed from one or more of the readings.

If the readings do not match, then there is an option to either compare one or both of these readings with a third (or more readings) of the tag taken with a third read head, and if one of these readings matches the third, then this may be acceptable and indicate which of the other readings was in fact the accurate and repeatable reading. Alternatively, the tag could be rejected if the two readings do not match within the present threshold value. Indeed, the different read-heads used for cross-checking could be of different ages than the primary head, so that all read-heads are not subject to the same level of mechanical wear, electrical 'burn-in' or general usage.

In some embodiments, it can also be taken into account that production line read heads can saturate or overheat (warm up) due to their continuous excessive use in volume production. This can be monitored and/or compensated for if limits are reached.

The production line system may also include a statistical (or other) check of the performance of the reading heads themselves. This would indicate when a head might need to be changed. For example, assume that the system actually included 4 read heads all reading along the same path. If one read head is consistently different from the other heads, then it can be assumed that there is a problem with that head and it should be changed. The measure of "consistent" performance can be done in many ways. One example is that if a head is outside the matching threshold of the other heads more than 5 times in 20 consecutive readings, then it is deemed to be suspicious, and the system may trigger an alert for operator intervention/investigation.

Calibration runs can also be run using a length (reel) of pre-characterized fingerprints that are re-read from time to time to look for drift or changes within the same production line module. Similarly, in some embodiments, all read heads used in production can be correlated against a "golden sample", for purposes of calibration. Additionally, since the read heads may be slightly offset, some embodiments may allow for a slight shifting of data, and for reading beyond the total area of the data being matched.

Another function of multiple readings on the disordered tag production line is that the readings can be knowingly offset or different from each other. For example, if the reading devices have a known tolerance range, e.g. the reading devices can behave slightly differently, then multiple read heads can be used on the production line to cover the threshold range and to take enough different readings for storage on the data server to ensure that a reading from most any reading device can be accurately matched. In some embodiments, rather than storing multiple readings in the data server, it may be possible to store only one reading, along with data on allowable and/or observed variation in selected aspects of the reading.

Figure 3:
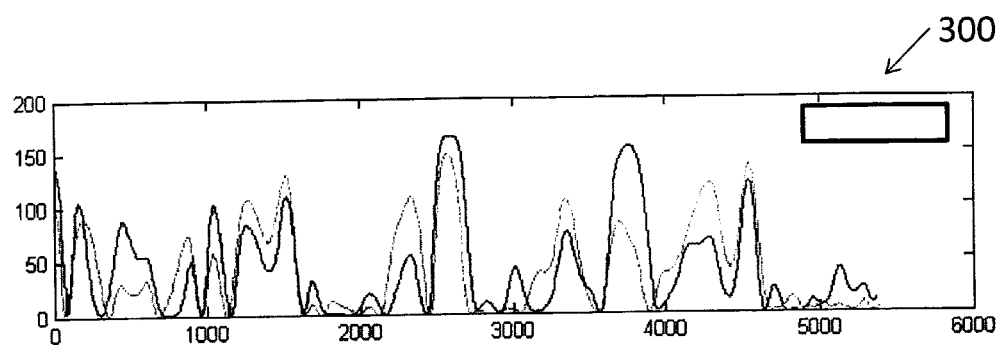
FIG. 3 shows signals obtained by two adjacent readings of the same inherent disorder tag.

An example related to reader tolerances or tolerances in the overall system is explained below with reference to FIG. 3. A track of information being read by a reading device may not always be perfectly aligned. The peaks seen during the readings can change as shown in FIG. 3. Graph 300 shows the signals obtained from two adjacent readings of the same tag. The data from the first reading are shown in a first plot 302, and the data from the second reading are shown in a second plot 304. As can be seen, the data are similar but the individual peaks have changed. In some cases, a peak in the first plot 302 is higher than the corresponding peak in the second plot 304, while in other cases, a peak in the second plot 304 is higher than the corresponding peak in the first plot 302. This is understandable, since for some magnetic particles the shift will have moved the path further from the particle (causing a weaker peak), while for other particles, the shift will have moved the path closer to the particle (causing a stronger peak). Because the tag is disordered, it is impossible to predict from the first reading what the shift will cause, i.e. which peaks may get stronger, which may get weaker, which may disappear completely, which new peaks may arise, and if there is any shift in the x-axis position of a peak.

In accordance with an embodiment of the invention, the production line can be set up to have four adjacent read heads, for example. Each read head can be configured to follow a path that is adjacent to, but slightly shifted from the paths of neighboring read heads. Such a configuration is shown in FIG. 4, in which four read heads 406a-406d are used to read four shifted but adjacent paths 408a-408d across the same tag, including fingerprint material 104, with particles 102 distributed in a disordered manner.

Figure 4:
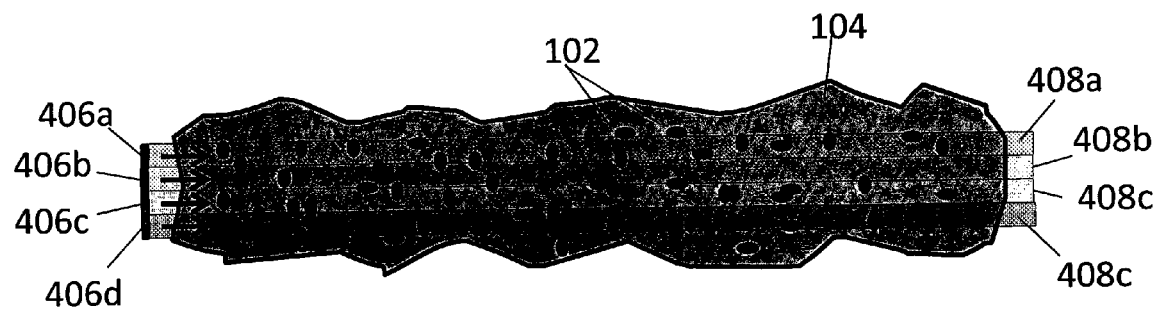
FIG. 4 shows a configuration of four adjacent read heads used to read an inherent disorder tag during a manufacturing process.

In some embodiments, the shift between each read head 406a-406d would not be quite as large as portrayed in FIG. 4, which shows such a large separation for illustrative purposes. There would, generally, be some overlapping area being read between the nearest neighboring adjacent readings. If there is a portion of overlap, then the four readings can be compared with each other to obtain acceptance criteria. It should be noted that as used herein, overlap does not necessarily mean overlap in the physical path, but overlap in the sense that at least some portion of the signals read from adjacent readings are affected by the same portion of the disordered material.

An example of acceptance criteria could be:

1. Individual reading criteria: all readings return signals of sufficient strength and complexity, e.g. sufficient numbers of peaks seen above predefined thresholds.

2. Cross-correlation criteria: The signal from each reading must match the signal from its nearest neighbor reading(s) within a certain threshold, i.e.

The R1 matches R2 above the acceptance matching threshold;

R2 matches R3 above the acceptance matching threshold; and

R3 matches R4 above the acceptance matching threshold.

Where R1, R2, R3, R4 represent the data/signal obtained from the read heads 406a, 406b, 406c, and 406d, respectively, as depicted in FIG. 4 (except, as noted above, FIG. 4 shows the readings having little to no overlapping area, which would likely not be the case). By "matches" we mean correlates to within a predetermined threshold level according to a suitable matching algorithm (e.g. a correlation function). It will be understood by one of ordinary skill in the art that many such suitable matching and/or correlation algorithms exist and are well known in the art.

If the tag fails either one of the two broad acceptance criteria discussed above then it may be rejected (or otherwise reprocessed as discussed previously).

When a tag is rejected, there are numerous ways that this may be handled in accordance with embodiments of the invention. For example, rejected tags may be marked, cut out, or punched out. Preferably, rejected tags can be removed (i.e., avoiding accidental issuance of failed tags), without stopping the flow of production in a mass production environment.

Rejected tags can also be noted in the database. This permits additional checking that the rejected tags have been removed. For example, the number of rejected tags should match the number that have been noted in the database.

Even though the readings are expected to be somewhat different between the read heads 406a-406d, in certain cases it is still possible to obtain real-time statistical information regarding each read head that would indicate whether an individual head was developing a problem that may need intervention from the operator. For example, if read head 406c was consistently not matching well with its neighbors (406b and 406d), then the operator could be instructed to stop the process (or the process could stop automatically) and inspect/change the read head 406c.

Following on from this example we can determine methods in accordance with embodiments of the invention for choosing a) a minimum number of read heads that should be used on the production line, and b) how far apart these read heads should be spaced. It should be noted that although physical distance or "space" is used for illustrative purposes, it will be understood by one of ordinary skill in the art that the same principles may be applied to any variation between readers, e.g. other differences such as age of the readers, tolerances between readers, etc. Therefore, terms such as "distance", "space", and "offset" as used herein to describe physical separation between readers are also understood to mean any differences between readers that may result in different readers reading similar, but slightly different signals from the same tag.

Figure 5:
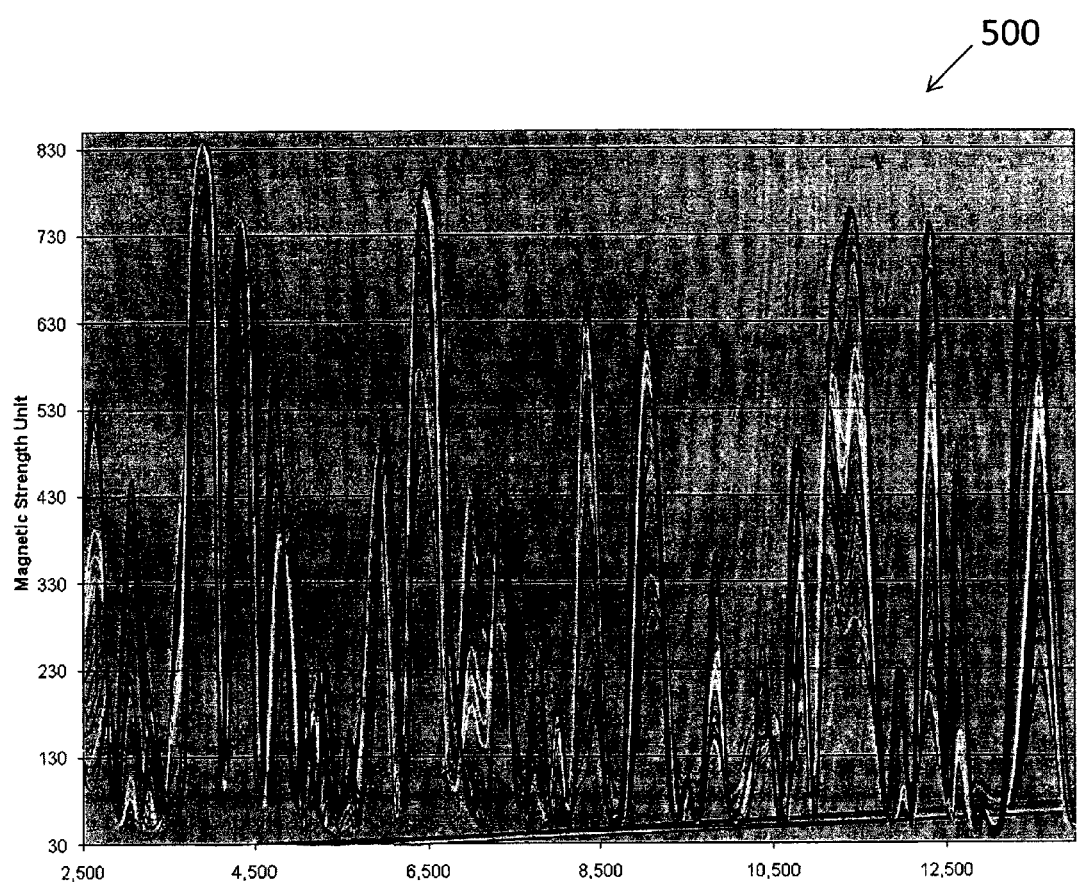
FIG. 5 shows a graph of data captured with multiple adjacent readings of the same inherent disorder tag.

As a first step in an example method for choosing these parameters, the variation in reading with offset is established. FIG. 5 shows a graph 500 of data captured with multiple adjacent readings of the same tag (the path between each adjacent reading is changed very slightly, e.g. 10 microns).

The multiple adjacent readings are repeated over multiple tags. The multiple tags may be selected based on any of a number of criteria, such as a predetermined number of tags, tags that were read during a selected period of time, all tags associated with a particular production run, all tags read by the reader, or other criteria. Each reading is then correlated against the other readings from the same tag using the desired matching and/or correlation algorithm, as discussed above. Thereafter, information corresponding to the information shown in plot 600 of FIG. 6 can be computed.

Figure 6:
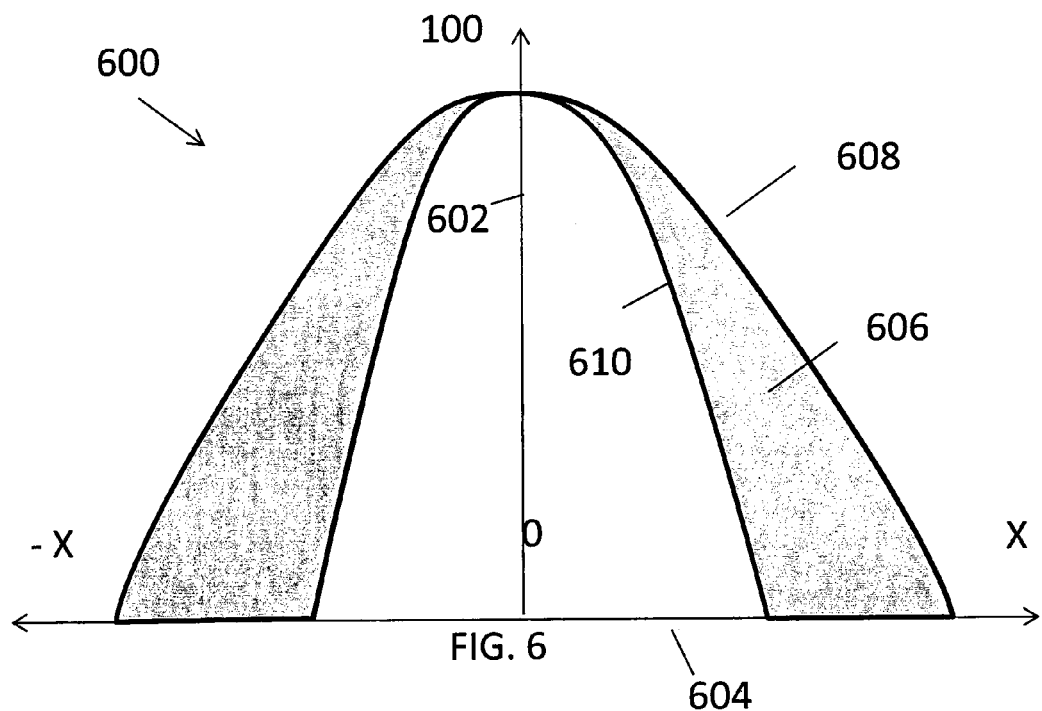
FIG. 6 shows a plot of the correlation between a reading and all of its adjacent readings for the same inherent disorder tag.

FIG. 6 shows a plot 600 of the correlation between a reading and all of its adjacent readings for the same tag, for all of the data from tags that have been read. The graph 600 shows the degree of correlation as a percentage (on the y-axis 602), plotted against the distance between the readings (along the x-axis 604). All the data (perhaps excluding spurious outliers if there is a plausible reason to exclude them) are contained within the envelope 606 between the best correlation 608 and the worst correlation 610, as shown. If the distance between the readings is zero (zero on the x-axis 604), then the matching between the readings will be expected to be very high, perhaps 100% or close to it, as it is essentially the same reading. But as the distance between readings increases (i.e. going away from the 0 position of the x-axis 604 in either the positive or negative direction) the matching decreases. Statistically, however, for the same distance shift, some readings will match better than others, and so the data may begin to spread (between the best, 608, and the worst 610) as shown by the envelope 606 in the plot 600. By choosing some sensible criterion, an envelope around the data can be obtained. For example, the "sensible" criterion could be that 99.9997% of the data needs to be contained within the envelope. Note there does not necessarily need to be millions of measurements taken to define this, since standard deviations can be used to estimate these envelopes when a statistically relevant sample size is obtained.

It should be noted that in many situations, the plot 600 in FIG. 6 may be symmetric in the x-axis, so only one half of the data needs to be considered. However, for the sake of clarity, the entire plot is shown in FIG. 6 and subsequent figures.

Figure 7:
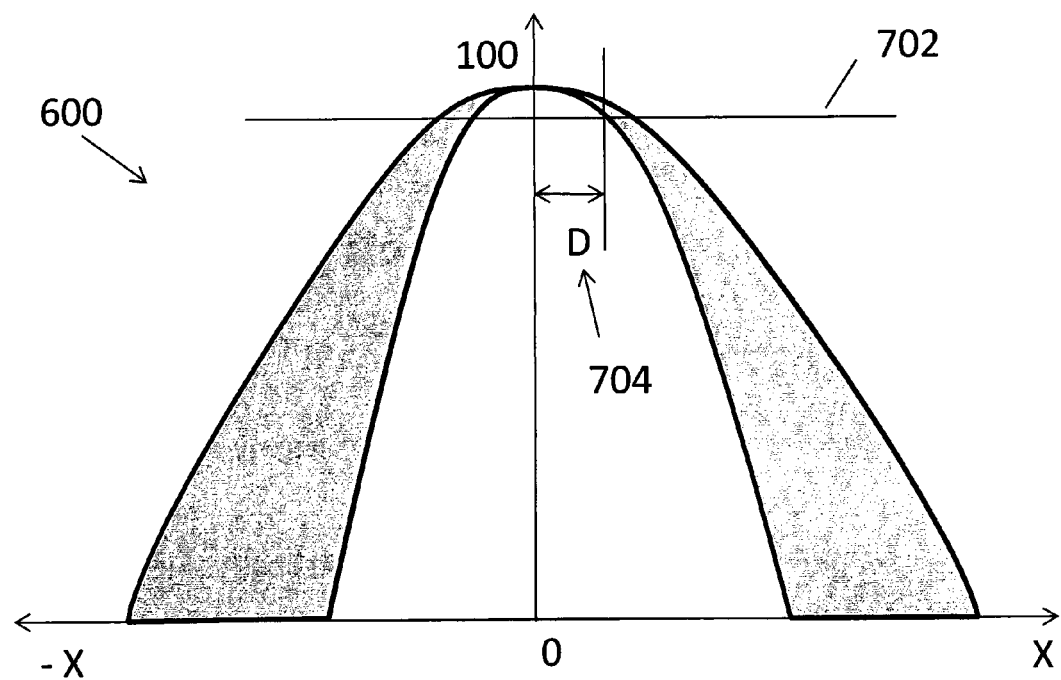
FIG. 7 shows an acceptance threshold on the plot of FIG. 6.

Using a graph such as plot 600 (or the data shown in the plot 600), depending on the intended uses of the tags, a reasonable correlation level can be set. This "reasonable" correlation level may be calculated based on the False Acceptance Rate and False Rejection Rate that the system is designed to achieve, as discussed in greater detail below. For example, assume that it is decided that a 95% correlation will be sufficient for the system to return a "successfully matched" response to the reading device in the field. This correlation level (including a factor of safety perhaps, e.g. making it 96%) can be plotted on the graph Plot 600. FIG. 7 shows this acceptance threshold 702.

From this, a maximum distance between adjacent readings can be found, such that at a greater distance, the system can no longer guarantee (within 99.9997% confidence) that the two readings will match above the desired threshold. This distance is shown as distance "D" 704 in FIG. 7. The distance D 704 is measured based on the worst correlations 610 (i.e., inside of the envelope 606). This means that if two adjacent readings are less than D units apart, we can be 99.9997% sure that they will match above the set acceptance threshold, if they are further apart than D units, then we cannot guarantee this.

This means that if we read along one path in the production line and store that signal in our server, we can be 99.9997% confident that any subsequent reading misaligned within a distance of D in either direction to our reading will still match above our defined acceptance threshold. Based on this we can space our read heads on the production line apart as shown in FIG. 8 below.

Figure 8:
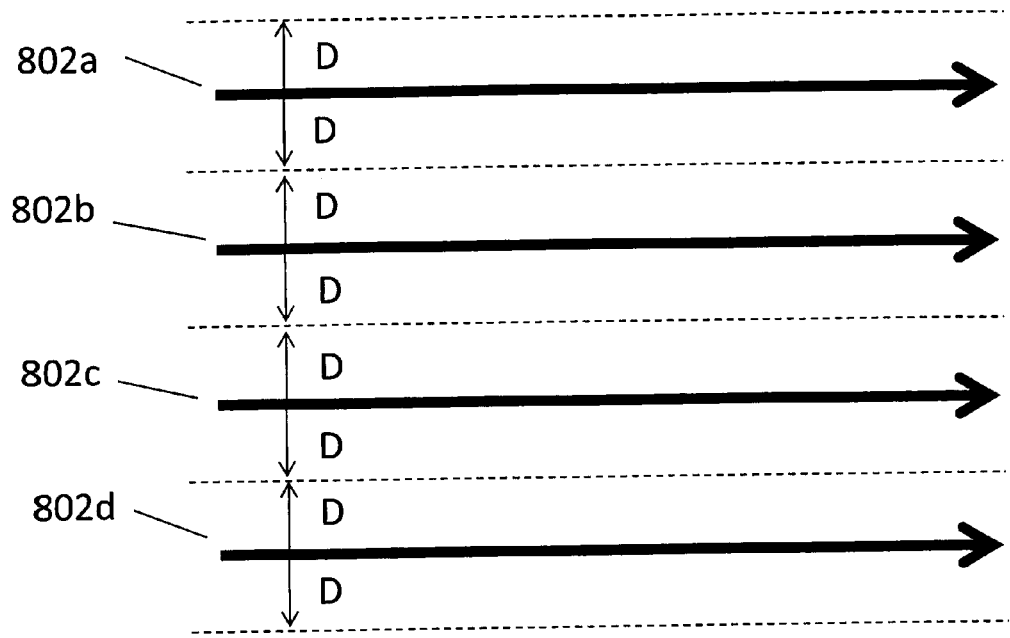
FIG. 8 shows a maximum spacing between the centers of read heads on a production line.

FIG. 8 shows the maximum spacing between read heads 802*a*, 802*b*, 802*c*, and 802*d* on the production line. Here, each read head is actually spaced a distance of 2D from its neighboring read head. With this spacing we are 99.9997% confident that any read head tracing a path between the two adjacent read heads will match with either one of the two adjacent read heads above the defined correlation value. So, four read heads 802*a*-802*d*, spaced as shown in FIG. 8, can give us confidence that any reading along any adjacent path within a total distance of 8D (or ±4D from the center of the paths) will be correctly matched by the system.

Figure 9:
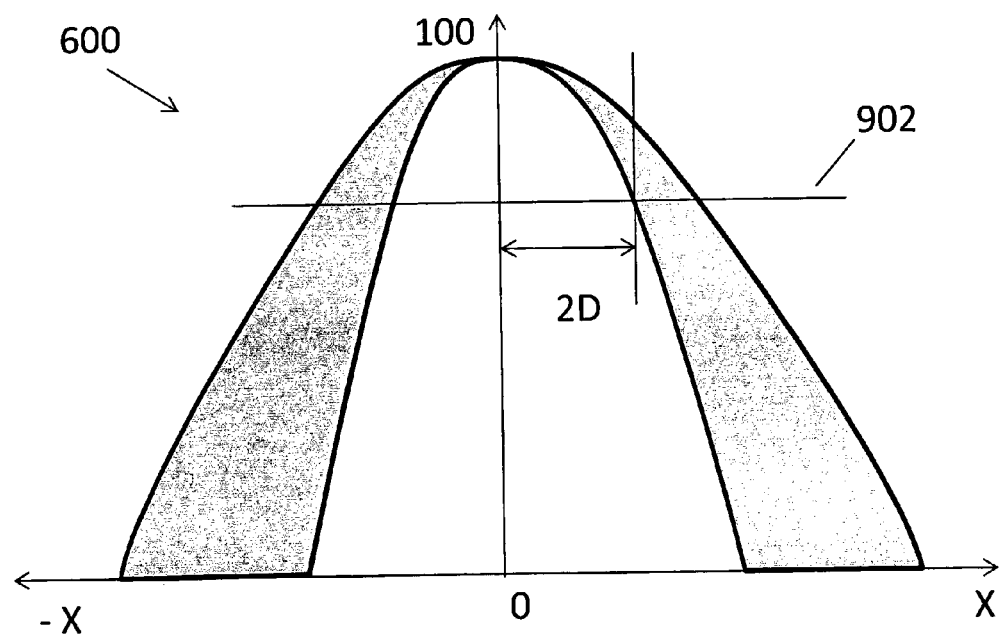
FIG. 9 shows a correlation threshold on the plot of FIG. 6 based on the spacing shown in FIG. 8.

In this case, the production line acceptance criterion of matching between two read heads cannot be the same as the overall 95% correlation that was defined for the system, because the read heads are spaced a distance of 2D units apart instead of the D units that was considered for the overall system. But from the plot 600, we can find the appropriate matching threshold between read heads on our production line, as shown in FIG. 9, which shows the correlation threshold 902 at a distance of 2D. Although FIG. 9 shows a dramatic drop in the correlation threshold on the production line, in general this is not the case. The drop shown in FIG. 9 is exaggerated for the sake of illustration and explanation. This shows that the appropriate correlation threshold for two read heads on the production line is lower than the correlation threshold for the overall system, as it is calculated based on the point where the inside of the envelope is a distance of 2D units from the axis (see FIG. 9).

This can be used to determine the minimum number of heads that should be used on the production line, but more heads can be used if greater confidence is required. Of course, using additional read heads may also require additional data processing and storage capacity.

In volume production it might be beneficial to store more data points (higher resolution) fingerprints than will be read in the field, so that the matching algorithms can interpolate data and improve the reliability of a signal from the reader in the field. The extra resolution needs to be considered against the higher demands on memory storage that this may require and the expected usage profile of the fingerprints. For example, a high security application may require the ability to enhance the matching threshold in the future, which in turn would rely on the reference data being of high quality/high resolution. This extra resolution may also be useful for matching signals from a future field-usable reader, which may have an upgraded read-head and be able to provide a higher resolution image or signal.

In the examples discussed above, only paths that are parallel to each other have been considered. In some embodiments of the invention, the paths traced during reading of the tags may not be parallel with each other. The concepts discussed herein can be extended to cover such situations.

In addition it has been assumed that each of the readings from the production line is stored in the server and is available for matching when a signal comes in from a reading device in the field. In order to reduce space requirements, many techniques can be used. For example, in some embodiments, only one signature may be stored, and the variation on the peaks may be noted.

Figure 10:
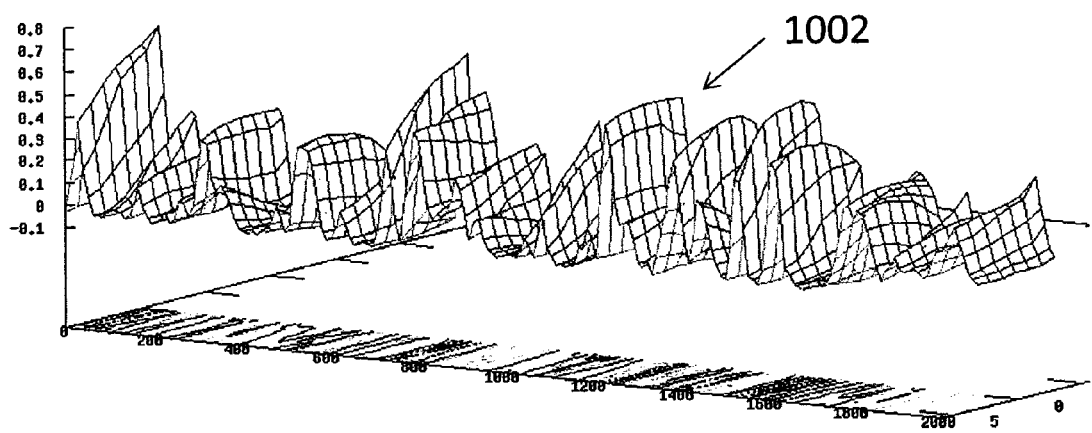
FIG. 10 shows a surface made up of multiple readings of an inherent disorder tag.

In some embodiments, non-parallel readings may be handled by storing or generating a surface (made up of the multiple readings). An example is shown in FIG. 10, which shows a surface 1002 made up of multiple readings. From this, a reading following any path along the surface 1002 can be matched. Depending on the situation, it may be desirable in some embodiments to limit matching to straight paths along the surface 1002.

In addition to characterizing tags during their production, the readers may also be tested and characterized during their production. For example, key items on the readers may be measured prior to shipping, and those measurements may be stored in the matching server/database to aid in accurate matching. Alternatively, the measurements may be stored within the readers themselves, and may either be sent with the signal, or used by the reader to process the signal. For example, in a reader that reads both optical features and inherent disorder magnetic features positioned in a disordered relationship to the optical features, the offsets between the optical sensors and magnetic sensors in the reader may be measured and stored for each reader during its manufacturing process (i.e., before it is shipped).

As mentioned above, the False Acceptance Rates (FAR) and False Rejection Rated (FRR) should be considered in analogue recognition systems. For example, an automated human biometric fingerprint recognition system has false acceptances (where a different fingerprint is incorrectly matched) and false rejections (where the correct fingerprint is rejected). This is based on many factors, not least of which is the quality of the reading (imagine a human fingerprint reading where an initial reading from the finger when it is clean is matched with a subsequent reading where the finger is dirty and has cuts in it). Therefore, systems such as the disordered matching systems described here may be designed with various FAR and FRR levels in mind, depending on the intended application. For example, a system may be required to have a FAR of less than 0.0001% and a corresponding FRR of less than 0.0004%. This depends on the security of the application and the acceptable cost/yield loss. In general, the stricter the FRR and FAR requirements, the more costly the system will be to set up and maintain since, for example, more tags will be rejected due to the more exacting thresholds. By doing a full FRR and FAR analysis, it may be possible to calculate acceptable matching thresholds between readings (such as those described above). Systems will have different FAR and FRR requirements depending on their application. For example if the application for the inherent disorder tags is very high security or very costly items, then the FAR and FRR criteria need to be very strict. If, however, the application of the inherent disorder tags is to a low cost mass produced product, then, to minimize the costs of yield losses in readers and tags, the FAR and FRR requirements can be loosened.

It will be understood that various embodiments of the invention as discussed above can be extended beyond the spatial misalignment described above. The same concepts can work for any system where the readings are different due to a variety of factors. These factors can be due, for example, to inherent differences in performance between different reading devices, or due to angular misalignment of readers, or other such uncertainty causing imperfect matching between readings with different reading devices. An example which may cause variation in readings is variation in the performance of components used in the reading devices, e.g. variations in the sensors that are used. Such sensor variations may be inherent in the manufacturing of the sensors or may arise because sensors from different suppliers are used. In a more extreme example, the readers being used to read the fingerprint material may themselves be readers from different manufactures which perform differently from each other.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method comprising:
    comparing a first reading from a first reader of an inherent disorder feature of a tag with at least a second reading from a second reader of the inherent disorder feature of the tag;
    comparing a third reading from a third reader of the inherent disorder feature of the tag with the first reading and the second reading;
    determining whether the tag can be read repeatably based on if the first reading and the second reading match within a predetermined threshold;
    accepting the tag upon determination that the tag can be read repeatably; and
    recording, in a database, a fingerprint characterizing the tag if the tag was accepted,
    varying the conditions for each of the first, second, and third readers, so that readings from each of the first, the second, and the third readers cover a range of conditions within predetermined thresholds.

2. The method of claim 1, further comprising determining one or more acceptance criteria based on an individual reading.

3. The method of claim 2, wherein determining an acceptance criterion based on the individual reading comprises determining an acceptance criterion based on a strength of a signal in at least one of the first reading and the second reading.

4. The method of claim 2, wherein determining an acceptance criterion based on the individual reading comprises determining an acceptance criterion based on a complexity of a signal in at least one of the first reading and the second reading.

5. The method of claim 1, further comprising:
    rejecting the tag if it is not accepted.

6. The method of claim 5, wherein rejecting the tag comprises removing the tag without stopping production of objects on which the tag is disposed.

7. The method of claim 6, wherein removing the tag comprises one or more of marking the tag as rejected, cutting out the tag, punching out the tag, and removing a tag using a suction method.

8. The method of claim 5, wherein rejecting the tag further comprises noting the rejected tag in a database.

9. The method of claim 1, further comprising:
    comparing, if the first reading and the second reading do not match within the predetermined threshold, a third reading of the inherent disorder of the tag with the first reading and the second reading;
    accepting the tag if the first reading and the third reading match within the predetermined threshold, or whether the second reading and the third reading match within the predetermined threshold; and
    recording, in a database, if the tag is accepted, a fingerprint characterizing the tag based on the first reading if the first reading and the third reading match within the predetermined threshold, or based on the second reading if the second reading and the third reading match within the predetermined threshold.

10. The method of claim 1, further comprising:
    comparing a third reading of the inherent disorder feature of the tag with the first reading and the second reading; and
    determining an acceptance criterion based on whether the third reading matches with the first reading or the second reading within the predetermined threshold.

11. The method of claim 10, further comprising:
    checking the performance of a first reader used for obtaining the first reading, a second reader used for obtaining the second reading, and a third reader used for obtaining the third reading.

12. The method of claim 11, wherein checking the performance of the first reader, the second reader, and the third reader comprises determining if one of the first reader, the second reader, or the third reader provides readings that are different from the other two readers.

13. The method of claim 1, wherein the method is configured to read and verify the tag based on the inherent disorder function during a process of manufacturing the tag.

14. The method of claim 1, wherein the inherent disorder feature comprises one or more of disorder of fibers within paper, random bubbles within a transparent polymer, randomly distributed quantum dots or nanobarcodes, disordered pattern of magnetic particles, disordered pattern of optically active or optically distinguishable particles, and disordered pattern of conductive or semi-conductive particles.

15. The method of claim 1, wherein the first and the second reading being obtained at one or more of manufacturing, quality control, shipping, and sales process prior to provision, use, and/or verification of the tag by the end user.

16. The method of claim 1, wherein the fingerprint comprises one of the first reading and the second reading, a composite of the first and the second readings, or a computational function of one or more the first reading and the second reading.

17. The method of claim 1, wherein the fingerprint is not recorded in the database unless the tag is accepted.

18. A method comprising:
    matching a first reading from a first reader of an inherent disorder feature of a tag with at least a second reading from a second reader of the inherent disorder feature of the tag;
    matching a third reading from a third reader of the inherent disorder feature of the tag with the first reading and the second reading;
    determining one or more acceptance criteria, wherein at least one of the acceptance criteria is based on whether the first reading and the second reading match within a predetermined threshold;
    determining whether the tag can be read repeatably based on if the first reading and the second reading match within the predetermined threshold; and
    varying the conditions for each of the first, second, and third readers, so that readings from each of the first, the second, and the third readers cover a range of conditions within predetermined thresholds.

19. A method comprising:
- using a first reader to take a first reading of an inherent disorder feature of a tag;
- using at least a second reader to take at least a second reading of the inherent disorder feature of the tag;
- matching the first reading with at least the second reading;
- determining one or more acceptance criteria, wherein at least one of the acceptance criteria is based on whether the first reading and the second reading match within a predetermined threshold;
- accepting the tag if the acceptance criteria are met;
- recording a fingerprint for the tag if the tag was accepted;
- using at least a third reader to take a at least a third reading of the inherent disorder feature of the tag if the acceptance criteria are not met; and
- varying the conditions for each of the first, second, and third readers, so that readings from each of the first, the second, and the third readers cover a range of conditions within predetermined thresholds.

20. The method of claim 19, wherein varying the conditions comprises varying at least one of an age of at least one of the readers, temperature conditions for at least one of the readers, construction of at least one of the readers, and components of at least one of the readers.

21. The method of claim 19, wherein varying the conditions comprises varying the conditions to cover an expected range of conditions for readers that will be used in a field.

22. The method of claim 19, wherein varying the conditions comprises offsetting the first, second, and third readers from each other.

23. The method of claim 22, wherein offsetting the first, second, and third readers from each other comprises offsetting each of the first, second, and third readers from each other by a constant offset.

24. The method of claim 23, further comprising using false acceptance rate and false rejection rate tolerances to determine the constant offset.

25. The method of claim 23, further comprising using the constant offset to determine a minimum number of readers to be used in a production line.

* * * * *